US008914041B2

(12) United States Patent
Bao et al.

(10) Patent No.: US 8,914,041 B2
(45) Date of Patent: Dec. 16, 2014

(54) METHODS OF LOCATING DATA SPOTS AND NETWORKS AND USER EQUIPMENT FOR USING THE SAME

(75) Inventors: Xuan Bao, Durham, NC (US); Uichin Lee, Daejeon (KR); Ivica Rimac, Tinton Falls, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 12/885,914

(22) Filed: Sep. 20, 2010

(65) Prior Publication Data

US 2012/0071174 A1    Mar. 22, 2012

(51) Int. Cl.
*H04W 24/02*    (2009.01)
*H04W 24/00*    (2009.01)
*H04W 48/16*    (2009.01)
*H04W 4/02*    (2009.01)

(52) U.S. Cl.
CPC ............... *H04W 48/16* (2013.01); *H04W 4/02* (2013.01)
USPC .................................... 455/456.3; 455/456.1

(58) Field of Classification Search
USPC .......................... 455/456.3, 45.1, 517, 552.16
See application file for complete search history.

(56) References Cited

U.S. PATENT DOCUMENTS

| | | | |
|---|---|---|---|
| 2004/0203890 A1* | 10/2004 | Karaoguz et al. | 455/456.1 |
| 2005/0128995 A1* | 6/2005 | Ott et al. | 370/349 |
| 2005/0220106 A1* | 10/2005 | Raverdy et al. | 370/392 |
| 2006/0064476 A1* | 3/2006 | Decasper et al. | 709/223 |
| 2007/0105577 A1* | 5/2007 | Bonta et al. | 455/517 |
| 2007/0167173 A1* | 7/2007 | Halcrow et al. | 455/456.2 |
| 2007/0192474 A1* | 8/2007 | Decasper et al. | 709/223 |
| 2008/0161013 A1 | 7/2008 | Friman | |
| 2009/0124284 A1* | 5/2009 | Scherzer et al. | 455/552.1 |
| 2009/0310570 A1* | 12/2009 | Smith | 370/335 |
| 2010/0312857 A1* | 12/2010 | Ehlers | 709/219 |
| 2011/0151924 A1* | 6/2011 | Miller | 455/552.1 |
| 2011/0209201 A1* | 8/2011 | Chollat | 726/4 |

FOREIGN PATENT DOCUMENTS

| | | |
|---|---|---|
| JP | 2005-341621 A | 12/2005 |
| WO | WO 2004/077753 | 9/2004 |
| WO | WO 2007/082912 | 7/2007 |
| WO | WO 2010/008409 | 1/2010 |

OTHER PUBLICATIONS

International Search Report and Written Opinion dated Nov. 24, 2011.
Japanese Office Action dated Dec. 24, 2013 for related Japanese Application No. 2013-529217.

* cited by examiner

*Primary Examiner* — Meless Zewdu
*Assistant Examiner* — Jean Chang
(74) *Attorney, Agent, or Firm* — Harness, Dickey & Pierce (57) ABSTRACT

Methods determine data spots in a network by identifying a transmission resource and its characteristics so as to determine geography of a data spot. Users are then directed to, locate, and/or move to the data spot and retrieve desired content. Users may be directed to the determined data spot, with a map or compass. Transmission resources include ad hoc hotspots for need by sideloading network users in a communicative proximity. Methods may match characteristics of the requesting network user with determined transmission resources to position a data spot. Example methods may be configured based on amounts of network resources consumed, third-party costs to a user, maximizing user experience by providing nearer and faster data spots, and/or any other desired criteria. Different portions of the methods may be performed by the network, the user, and/or third-parties, to reduce network burden while supplying users with desired content through data spots.

37 Claims, 5 Drawing Sheets

METHODS OF LOCATING DATA SPOTS AND NETWORKS AND USER EQUIPMENT FOR USING THE SAME

BACKGROUND

Cellular, Wi-Fi, radio, and other wireless/mobile communications networks conventionally allow individual users connected to the network to send and receive a variety of data, services, and media, including both on-deck and off-deck content such as voice, SMS, html, email, IPTV, internet radio, streaming video, etc. Such information is conventionally retrieved through the network, via a home agent or other centralized, network-controlled element having a high-bandwidth connection to the media providers (e.g., the internet) or stored content. The services and/or media are then distributed to individual users from the centralized network element via existing wireless connections between the users and network, i.e., in a "vertical" fashion.

Figure 1:
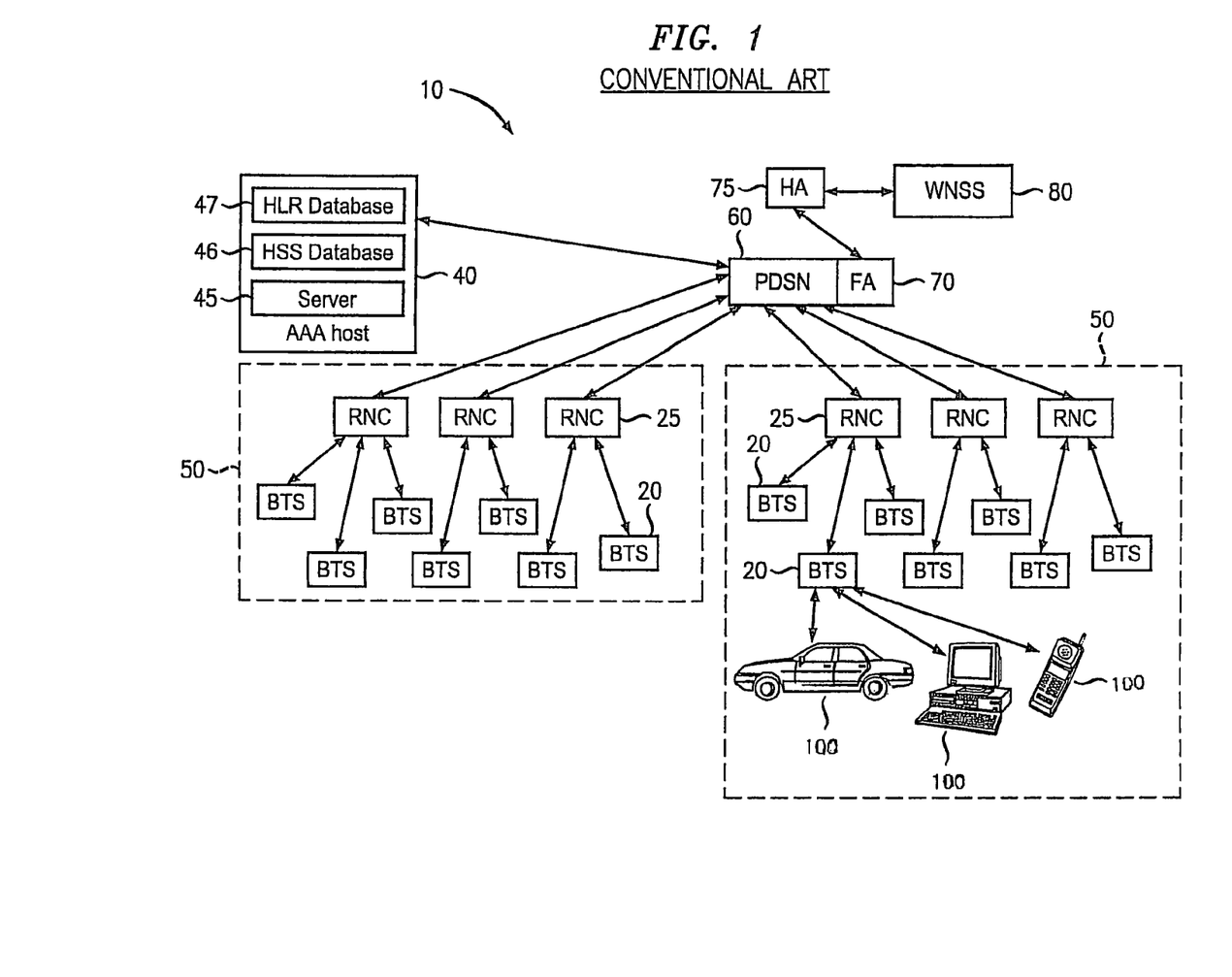
FIG. 1 is an illustration of a conventional wireless network architecture.

FIG. 1 is an illustration of a conventional wireless network architecture illustrating conventional vertical data exchange. As shown in FIG. 1, subscribers to a wireless network 10 communicatively connect via a mobile station 100, such as a cellular telephone, to one or more base transceiver stations (base station) 20. Data, including both control- and content-related data, services, media, and any other type of information that may be transmitted wirelessly is sent and received between the base station 20 and the mobile station 100. One or more base stations 20 may be communicatively connected to a radio network controller (RNC) 25 in conventional wireless network 10. Typically, several base stations 20 in a single geographic area may connect to a single RNC 25. The RNC 25 may transmit data from the base station 20 further "up" the wireless network 10, that is, further vertically removed from mobile stations 100. RNCs 25 may coordinate data transmission throughout the wireless network 10, including determining resource priority, transmission type between mobile stations 100 and base stations 20, and user handoffs between base station 20.

Information regarding number of users/mobile stations 100 connected to a particular base station 20 at any given time is conventionally accessible at individual base station sites. Available information includes number of users connected, a mobile station ID, length of connection time, and Quality of Service metrics for users being served by a particular base station 20. Network operators may periodically poll individual base stations 20 in order to gather data regarding total network usage and/or network traffic data.

The mobile stations 100, base stations 20, and RNCs 25 may all be part of a radio access network (RAN) 50. A telecommunications provider may operate one or more RANs 50 in providing telecommunications services in a variety of forms and areas. RAN 50 may be communicatively connected to a Packet Data Serving Node (PDSN) 60 via RNCs 25, in a CDMA network, for example. PDSN 60 may provide a variety of services to RAN 50, including Internet access, operational data, and/or network applications to the RAN 50, PDSN 60 may connect through a Foreign Agent 70 and/or Home Agent 75, which may include conventional servers, routers, and/or other internet access devices, to a wireless network services server (WNSS) 80, which may be provided to RAN 50 through PDSN 60. WNSS 80 may be one or more network provider-owned servers in a central or decentralized location(s) and may include, for example, hardware and/or software providing an internet browser, email management application, software downloading programs, etc. PDSN 60 may be further connected to a subscription/services management host, such as an Authentication, Authorization, and Accounting (AAA) host 40, which may serve as a gatekeeper to the various applications and data available through PDSN 60. AAA host 40 may include one or more servers 45, which may provide subscriber- and application-specific data and govern user access to WNSS 80 through PDSN 60. The host 40 may include an home subscriber server (HSS) database 46 and/or home location register (HLR) database 47 that maintain a listing of active users 100 network-wide for the purpose of matching subscription services with particular users based on their subscription data, log-on status, geographic location, etc.

Through the above-described network shown in FIG. 1, information may be controlled, accessed, generated, and/or transmitted through conventional networks 10 down to individual network users 100. Even with data compression, encoding, and specialized timing and control algorithms, vertical delivery of user-requested information to network users 100 through the network's wireless spectrum, such as through the transmission chain of WNSS 80—HA 75—FA 70—PDSN 60—RNC 25—base station 20—network user 100, may consume large amounts of spectrum and transmission resources in mobile networks. For example, a conventional Third Generation (3G) network in the United States lacks the spectrum and transmission resources to provide 40% of its subscribers with streaming or downloaded video of 8 minutes in length in any given day. That conventional 3G network, using Long Term Evolution transmission management, further lacks the spectrum and transmission resources to provide more than 7% of its users access video or other data at 500 kbps, under typical operational loads.

When demand exceeds these transmission capacities, conventional wireless networks, such as network 10 shown in FIG. 1, may degrade the user experience by, for example, dropping services, delaying downloads, or providing unusable data. Wireless network operators conventionally attempt to mitigate transmission resource shortages by deploying additional transmission hardware and/or acquiring more wireless spectrum, effectively increasing throughputs between vertical wireless connections in RAN 50.

Wireless operators further conventionally rely on stationary and accessible Wi-Fi hotspots to assist in providing user-requested data, services, and/or media, so as to take advantage of other spectrum, potentially not network-controlled for information delivery. Conventionally, mobile devices detect accessible Wi-Fi hotspots or land connections themselves and opportunistically acquire requested data that is otherwise unavailable or unusable from network spectrum.

SUMMARY

Example methods determine data spots in a network and include identifying a transmission resource, such as an ad hoc hotspot, and determining the resources characteristics, such as location. Example methods further determine a geographic position of a data spot that can send and receive content from the transmission resource. Any of the determined information in example methods is then provided to network users, so that any network user can locate and/or move to the data spot and retrieve desired content. In some example methods, the user is directed to the determined data spot, with a map or compass, for example, where requested content is available.

One or more transmission resources can be used in example methods, and content available from several transmission resources may be determined to better direct a user to where desired content is available. Example methods may also take advantage of matching characteristics of the network user, such as a sideloading capability or communication protocol compatibility of the user, with available transmission resources to determine a more exact area where the user can retrieve requested data. Example methods offer flexibility in determining data spots, consuming large or small amounts of network resources in their execution and satisfying several different parameters, such as achieving minimal network spectrum usage, reducing third-party costs to a user, or maximizing user experience by providing nearer and faster data spots for premium payment, for example. Example methods offer further flexibility by off-loading actions, like processing or resource monitoring, and transmission resources, like network spectrum, to users or other third-party providers, so that networks do not become overburdened.

Example methods may be additionally configured to adjust based on user or situational changes, providing new data spot positions based on any changes detected by or input to a user. Another enhancement includes the use of historical data in best determining transmission resource availability and best data spot position. Historical data may also be generated with example methods, without third-party assistance, so as to be readily available for further use in example methods.

DETAILED DESCRIPTION

Hereinafter, example embodiments will be described in detail with reference to the attached drawings. However, specific structural and functional details disclosed herein are merely representative for purposes of describing example embodiments. The example embodiments may be embodied in many alternate forms and should not be construed as limited to only example embodiments set forth herein.

As used herein, a "network operator" or "network" is defined as any communications scheme transmitting at least some information wirelessly in at least a portion of the network, including, for example, 4G, CDMA, Wi-Fi, GSM, WiMax, 802.11, infrared, EV-DO, Bluetooth, GPS satellite, and/or any other suitable wireless technology or protocol.

Similarly, as used herein, "a mobile station," "mobile device," "user equipment," "mobile user," "network user," or "subscriber" is a device capable of receiving or sending wireless data from/to a wireless network, including, for example, a cellular telephone, pager, push-to-talk device, wireless-equipped computer, wireless-equipped personal data assistant, smartphone, GPS device, or any other such device or combination of such devices.

Similarly, as used herein, "content" is defined as all data, information, services, programs, and media, complete or partial, that may be communicated to or among user equipment in a network, including, for example, voice, SMS data, voicemail, email, network services, html, real-time information like sports scores, traffic, news, or weather, streaming music, publicly-downloadable files, streaming video, downloadable video files, ringtones, flash applications, Java apps, etc.

Similarly, as used herein a "transmission resource" is defined as any content distribution device or source of content for network users that is consumed, reduced, burdened, or made unavailable to other users during content transfer to a user, including, for example, network base stations, transmitters, control circuitry, or call switches, network spectrum, Wi-Fi hotspots, ad hoc hotspots, other user equipment, orbiting satellites, Local or Wide Area networks, Ethernet connections, etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in example methods may occur out of the order noted in the figures or described in the specification. For example, two figures or steps shown in succession may in fact be executed in series and concurrently or may sometimes be executed in the reverse order or repetitively, depending upon the functionality/acts involved. Similarly, additional intervening steps may be performed among, before, or after any steps shown or described.

The inventors have recognized that, in addition to a vertical data delivery from a network or a stationary Wi-Fi hotspot, one or more other pieces of user equipment may provide requested content that is unavailable from a network or would consume fewer network transmission resources in doing so. For example, requested content that would be otherwise transmitted from the network and consume network spectrum or other network transmission resources may instead be transferred from one or several network users that have previously or concurrently acquired the requested content. Such transfer may occur over any protocol of transferring data between user equipment, with or without network facilitation, including Bluetooth, Wi-Fi (802.11a/b/g/n), etc.

Similarly, one or more pieces of user equipment may supply the requested content alone or in combination with network-based, vertical transmission resources, such as base stations. For example, a Java application, or app, running on a piece of user equipment may gather content from multiple financial websites and analyze the same for a user savings portfolio to be displayed on the user equipment. The app may acquire some content, such as real-time stock quotes and interest rates, from nearby network users having the quotes and rates, while acquiring other content, such as a user's stock holdings and banking information, from the network via a base station operated by the network, all while gathering yet further content, such as currency exchange rates or home mortgage rates, from a nearby stationary public Wi-Fi hotspot, so as to deliver desired app functionality with several pieces of content from both the network and other user equipment or non-network transmission resources. Additional examples and details of processes of acquiring requested content from several transmission resources, including other network users, is hereinafter defined as "sideloading" and is described in co-pending application Ser. No. 12/884,994, "METHODS OF PROCESSING REQUESTS FOR CONTENT AND INITIATING AN INTERCONNECTION FOR THE CONTENT" filed Sep. 17, 2010, which is herein incorporated by reference in its entirety. Similarly, any area within a communicative proximity of a network sufficient to sideload requested content between network users is defined herein as an "ad hoc hotspot."

The inventors have further recognized that, while delivering requested content to users via sideloading may reduce network resource demand and/or permit more content to be delivered and consumed by network users, sideloading may not be possible when a network user is in an area with no nearby or accessible/compatible network users. For example, a network user travelling alone with access to only a network-operated base station may require the base station to deliver all requested content over spectrum available to the base station, consuming only network transmission resources in acquiring the user-requested content. Worse, the network user may be prevented from acquiring the desired content if the network, or just the associated base station, is overburdened or crowded with network users consuming its transmission resources. The inventors have addressed this previously-unrecognized problem with ad hoc hotspot availability by developing example methods that enable a network user to acquire content from, and/or direct a network user to, geographic positions having additional transmission resources to provide requested content. As such, example methods may reduce consumption of network transmission resources, such as spectrum and base station usage and crowding, and problems associated with the same and/or increase content availability to and consumption by network users, in addition to other advantages.

Figure 2:
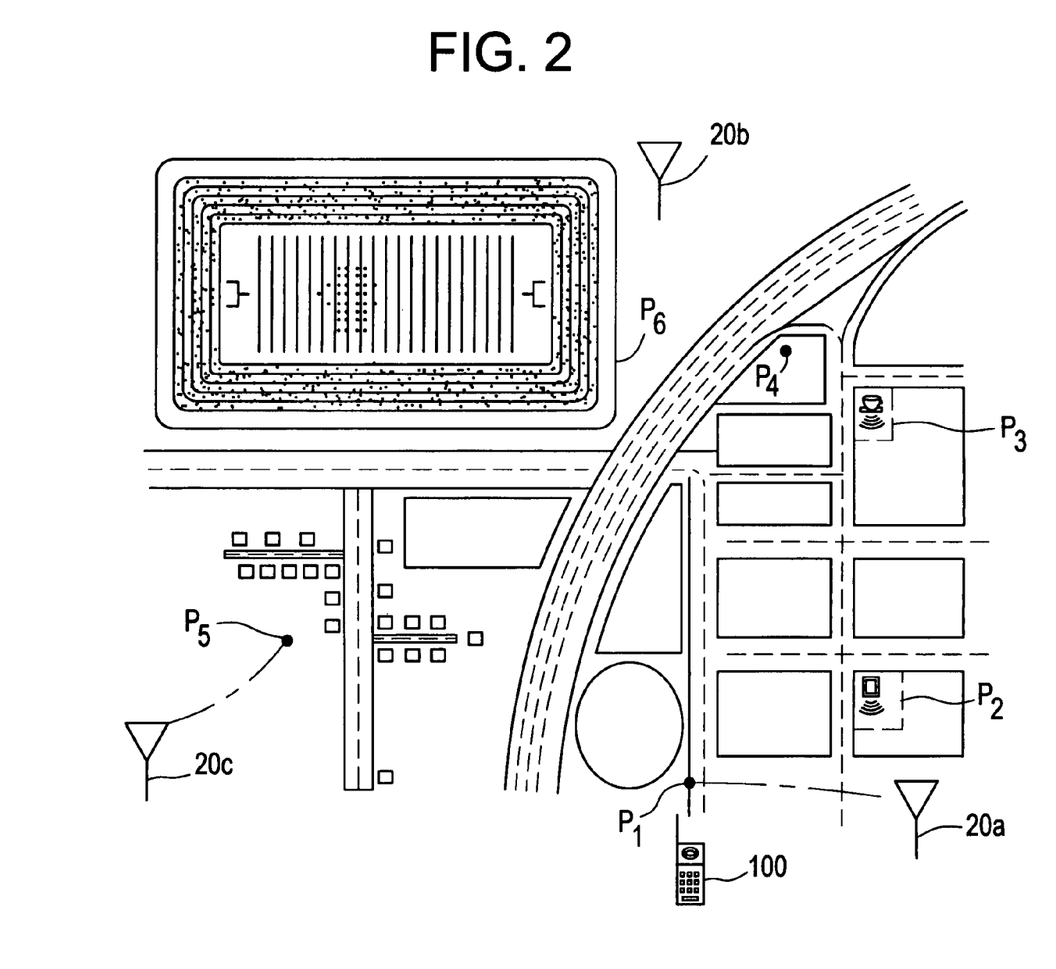
FIG. 2 is an illustration of a network service area where example methods may be deployed.

FIG. 2 is an illustration of a typical network scenario where example methods may be used. In FIG. 2, a network user 100 is at location $P_1$ within a generally populated area, such as a city, suburb, town, etc. The network user 100 may be associated with base station 20a and may be provided content, such as voice, text, email, html, streaming video, Internet radio, SMS data, etc., over network-controlled spectrum available between base station 20a and user 100. That is, when network user 100 requests a certain content, such as placing a call, for example, that content is delivered vertically from the centralized network, such as through a centralized home agent, to network user 100 through a wireless/cellular connection between user 100 and base station 20a. Of course, the network may also deliver the requested content through other transmission resources, such as a satellite, Wi-Fi access node/hotspot, or land line connection, for example.

Requested content may be unavailable, at the time requested and/or thereafter, from base station 20a because of a lack of network transmission resources. For example, base station 20a may reach a data throughput limit, exhaust its available spectrum, suffer a power outage, or otherwise lack transmission resources to readily provide all or some requested content to user 100 associated with only base station 20a. Similarly, the network may be overburdened at higher network levels or lose access to content, such as the Internet, at the higher network level, and the requested content may not be vertically delivered to base station 20a or network user 100 associated therewith. This may result in the above-discussed problem where user 100 receives requested content slowly, in an unusable or delayed fashion, or not at all.

Within the area shown in FIG. 2, several other locations may have greater transmission resources to provide the requested content to network user 100. For example, a public library at geographic position $P_2$ may offer free public Wi-Fi or other internet services available to network user 100 in the form of publicly-accessible wireless hotspots or other access nodes. Or, for example, a heavily-populated cafe at geographic position $P_3$ may be filled by network users or non-network users forming an ad hoc hotspot where requested content may be sideloaded to network user 100. The cafe at geographic position $P_3$ may also offer patron-limited internet services as a further transmission resource. Or, for example, a heavily-trafficked road, such as a highway or interstate may carry motor traffic, some of which may include users capable of sideloading requested content to network user 100, so as to form another ad hoc hotspot along the road, including at geographic position $P_4$ within transmitting distance of such ad hoc hotspot. Or, for example, an under-used base station 20c at geographic location $P_5$ servicing relatively few users and having available transmission resources may provide the desired content to network user 100. Or, for example, an orbiting satellite offering transmission resources for requested content may have uninterrupted communicative contact with an area around $P_5$. Or, for example, a crowded stadium at geographic location $P_6$ may be filled with other network users capable of sideloading requested content to network user 100 such that an ad hoc hotspot is formed around the stadium, including $P_6$.

Although network user 100 cannot receive requested content, such as high-bandwidth streaming videos, for example, in a timely or complete fashion at $P_1$ because of a lack of network transmission resources at $P_1$ where access to only base station 20a is possible, several other geographic positions $P_{2\text{-}6}$ accessible to network user 100 may have transmission resources to provide the requested content. Examples of such transmission resources in FIG. 2 may include a network resource like base station 20c, a publicly- or privately-operated accessible internet hotspot, an orbiting satellite, and/or an ad hoc hotspot where sideloading the requested content is possible, in any combination.

Specific geographic positions, such as $P_{2\text{-}6}$ described in the example of FIG. 2, having communicative access to sufficient transmission resource(s) for access/consumption of the requested content are herein defined as "data spots." As such, data spots do not include positions such as $P_1$, where any portion of requested content is not readily available to network user 100, because of a lack of transmission resources to provide the content, even though some other or partial network coverage or services may be available at the position. Example methods include transmitting, to network user 100, information of geographic positions $P_{2\text{-}6}$ where requested content is accessible through data spots, including information as to how to find/move within a functional distance of data spots.

Example Methods

Figure 3:
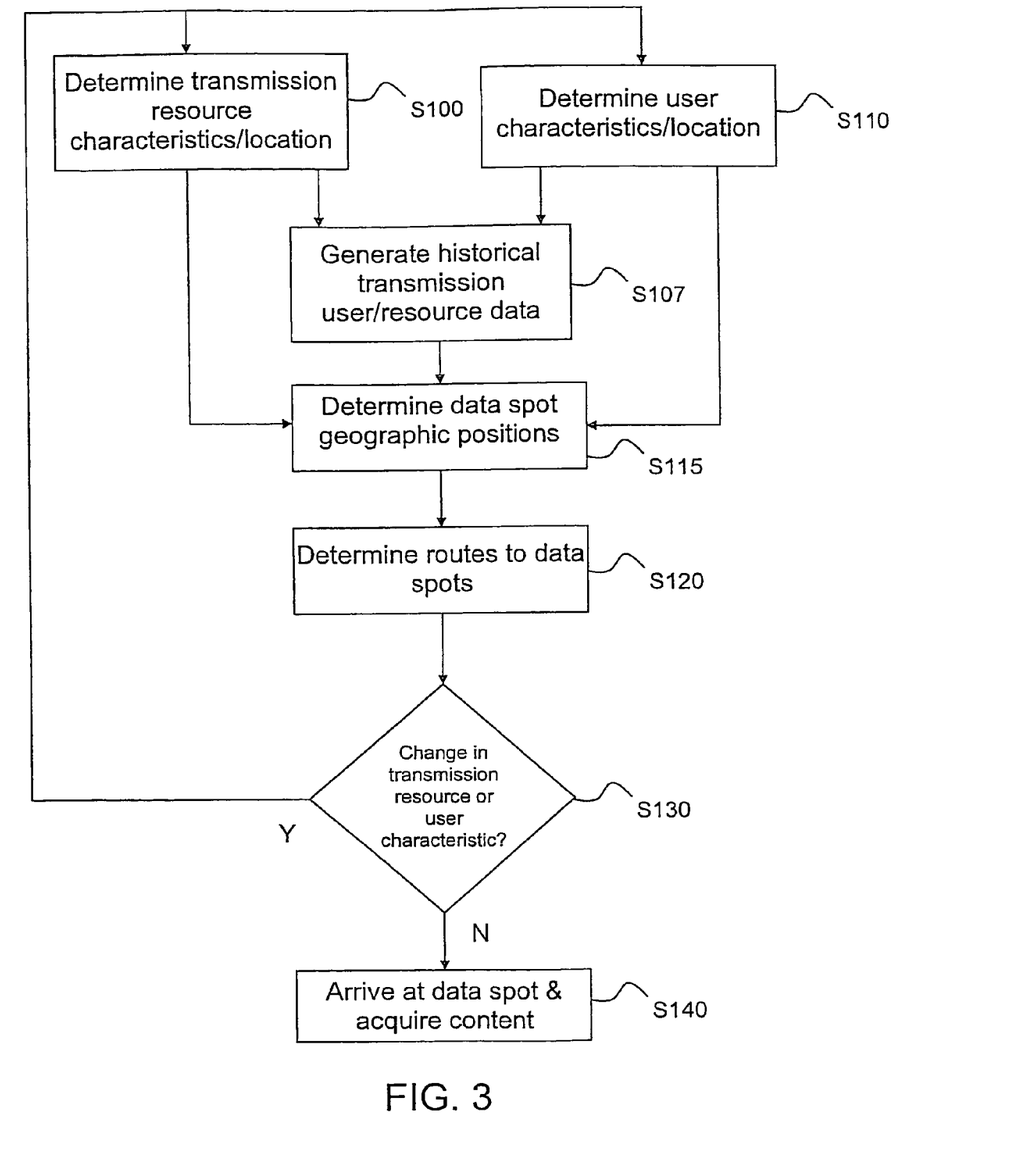
FIG. 3 is a flow chart of an example method of locating a geographical position of a data spot.

FIG. 3 is a flow chart of an example method of providing a network user with information to locate, move to, or otherwise access at least one data spot at a geographic location, such as $P_{2-6}$ in FIG. 2, where desired content may be acquired through a transmission resource such as the network, the internet, sideloading, etc., sufficiently present/accessible at the data spot.

As shown in FIG. 3, transmission resources within a given area are determined in S100. If the transmission resources are not inherently at a single or known position, the transmission resources are correlated with a specific geographic position in S100. The area sampled in S100 may be a specific area, such as the urban area of FIG. 2, or any other collection of positions, jurisdictions, or even an entire network coverage area, such as network 10 shown in FIG. 1, for example. Identification of transmission resources in S100, may be achieved in several different ways using several different information sources to the network and/or users, discussed in the following examples.

For some types of transmission resources, the network, without network user feedback, may have or access data indicating existence or nature of the transmission resources in S100. A network may determine, from internal operational parameters, base stations that are not utilizing all available spectrum or other transmission resources and are thus currently available to provide user-requested content. For example, in FIG. 2, the network may determine that base station 20c can provide content unavailable at $P_1$ and may couple the availability of base station 20c with a known coverage area of base station 20c, based on topography or surveys, for example. In this way, in S100 the network could identify a large area around base station 20c as having transmission resource availability for network user 100, any of which potentially being a data spot determined in S115, discussed below. As a further example, the network may access the Internet or use a pre-built database to identify publicly-accessible Wi-Fi hotspots useable as transmission resources, such as regions including $P_2$ and $P_3$ in FIG. 2. Still further, another third-party network, such as an operator of satellites capable of providing the user-requested content, may provide data to the network indicating that access to the satellite-delivered content is available for a certain area in S100, such as an area including $P_5$ having satellite coverage.

For other types of data spots, the network or network users may use information or feedback from users to determine accessibility and/or locations of transmission resources in S100. The network, through known single- or multi-base station geographic location processes such as triangulation or E911, for example, may determine populations and locations of users associated with a base station within a certain area, combined with knowledge of user sideloading capabilities, to qualify the area as an ad hoc hotspot transmission resource. With reference to FIG. 2, the network may know a large number of users are connected to base station 20b, and with additional sector refinement, identify areas around geographic positions $P_6$ and $P_4$ as ad hoc hotspots in S100 that may be useable as data spots. Alternatively, user 100 alone may determine a large number of other sideloading-capable users are within the vicinity of $P_4$ through sniffing handoffs from base station 20a, for example. The user 100 may then determine that an ad hoc hotspot is formed in the area including $P_4$.

Further, network users may provide the network with information of their location, sideloading capabilities, and other transmission resource information for use in S100. For example, network users may determine, through Wi-Fi, Bluetooth, cellular signal sampling, etc. that several other network users are within a proximity sufficient to form an ad hoc hotspot for sideloading content and report this area to the network. Similarly, network users may individually determine their location through GPS, access node identification, network user input, base station identification, etc., and report the location to the network. Using this position information received from each network user, the network may determine where ad hoc hotspots exist based on user density. Still further, network users may detect available transmission resources, such as accessible Wi-Fi hotspots, unused base stations, or positions with satellite access, and make the locations of these detected transmission resources available to the network. As such, transmission resource information may be generated and provided by a network, by the network users, or by operator input to the same, such as by a human operator input to user equipment. In this way, the network may use information or feedback from network users and/or data provided by other sources, to determine transmission resource availability and position in S100.

Determining transmission resource identity and position in S100 may be distinct actions or performed in a single action. These actions may sometimes occur together when a transmission resource is necessarily available only at a single area or within a limited area, by virtue of its identification. For example, when a number of network users associated with a base station is determined in S100, this determination may inherently also determine the location of such users by virtue of base station location capabilities. Or, if a user or network pulls Wi-Fi hotspot information, such information may necessarily describe the position of the hotspot in communicating the existence of the hotspot (e.g., "public library wireless network").

Additionally, determination of transmission resource availability in S100 may include more than simply surveying areas for existence and position of ad hoc hotspots, Wi-Fi hotspots, available base stations, satellite access, and/or any other transmission resource. The speed, required credentials, access limitations, communications protocols, operating frequency, hours of availability, and any other characteristic may be determined as well, either inherently in identifying the transmission resource (e.g., detection of a Wi-Fi hotspot may necessarily indicate the hotspot is compatible with Wi-Fi communications protocols) or through acquiring additional data (e.g., an identified satellite may have times and locations of availability based on orbit information). The network and/or users may further survey the transmission resources based on content available therefrom. Several methods are useable to associate available content and/or other characteristics with specific transmission resources.

For example, the network may determine if publicly-accessible Wi-Fi at a library at $P_2$ can provide a particular requested content, such as a web service or streaming videos. Or, for example, in an ad hoc hotspot such as a stadium near $P_6$ or café at $P_3$ in FIG. 2, the network may further query network users as to what content is stored or otherwise available for sideloading. Or, the network users may provide such content information to the network. As a further example, the network may monitor what content has previously been transmitted to sideloading users at an ad hoc hotspot, through another transmission resource; for example, in FIG. 2, a network may determine that real-time sports scores are available at data spot $P_6$ because this content has been repetitively delivered from base station 20b to a known ad hoc hotspot formed at the stadium. Such surveying may be associated with specific network users to precisely monitor ad hoc hotspot quality/availability based on knowledge of the users making up that ad hoc hotspot or may be aggregated to preserve individual privacy, particularly if transmission resources are associated with content in S100 and transmitted to third parties.

Identification of transmission resources and content available from the same in S100 may be further based on user-requested content. For example, the network may survey transmission resources and what content they may provide for a match with specific content requested by a user. Or, identification of transmission resources and content available from the same in S100 may be determined generally, without significant regard to a user request. For example, the network may survey an area for any transmission resources and content available therefrom and maintain a database of all content associated with found transmission resources and determined data spots, to potentially match with later user content requests.

At least one advantage of determining transmission resource geographic positions and/or characteristics in S100 is that the network can amass transmission resource information on a much larger scale than any individual network user. That is, a network may be able to survey and receive data from several different network users and information sources that are not within a transmission distance of or otherwise accessible to each other network user. This may be especially helpful for network users, such as network user 100 (FIG. 2), having only limited access to a single network transmission resource, such as crowded base station 20a, where the network alone can provide much greater unobtainable information regarding other transmission resources.

Another advantage of determining transmission resource geographic positions and/or characteristics in S100 is that the network can centrally and flexibly analyze data in these determinations, based on several factors or demands. That is, centralized network equipment gathering data and producing transmission resource geographic positions, content availability, and/or other characteristics in S100 may have large computing/analyzing capacity beyond what individual user equipment possesses, so as to more quickly/accurately/comprehensively perform the determinations and analysis of S100.

Another advantage of example methods is that the network may further selectively analyze transmission resource information in S100 depending on available computing resources, user need, time available, and/or application precision needs. For example, the network may generate a very simple map of network user positions in S100 and look at only highest density areas to determine ad hoc hotspot locations in S100. This example method may consume minimal analysis resources and produce low-size transmission resource information that may be transmitted to users without consuming large amounts of network transmission resources. Or, for example, the network may also generate very large, elaborate transmission resource location registers based on several different types of transmission resources such as ad hoc hotspots, Wi-Fi hotspots, satellite availability, base station availability etc., the content available through each transmission resource, historical characteristics generated in S107 (discussed below) or otherwise obtained of each transmission resource, transmission speeds and reliability of each transmission resource, cost of using each transmission resource to the network and user, etc. This example elaborate transmission resource analysis and characteristic correlation may consume more network analysis resources and provide more information regarding transmission resources and their accurate location. Because of the flexibility in example methods including S100, the network or user may pursue either simple or complex determinations in S100, or custom type of determination, to satisfy user needs and/or best use available resources.

In S110 characteristics and location of the network user finding data spots with example methods are determined. The geographic position of the user may be manually input by a human operator of the user equipment or determined by several known methods, including GPS location, base station identification, E911 methods, Wi-Fi hotspot identifiers, and/or any other process of determining location. Geographic user position may be determined and/or updated using known methods with internal accelerometers, gyroscopes, and inertial localization, for example. Similarly, geographic user position may already be known from the surveying of transmission resources in S100, which may include the user as a potential sideloading resource. The geographic position may be transmitted to the network or maintained in the user equipment, either of which may perform actions based on the location and characteristic of network user determined in S110 in example methods.

Characteristics of the network user may include Wi-Fi compatibility, Bluetooth capability, 802.11 operations, BlueTorrent compatibility, push to talk abilities, 3G statuses, operating protocol, satellite telephony capability, data reception speed/status, GPS capability, sensor availability, and/or any other relevant technological characteristics that affect what types of transmission resources are eligible data spots for a particular user. Characteristics may further include logistical and travel modes of the user, including, for example, whether the user is moving by foot, bike, car, public transportation, whether the user has access to a building or area, whether the user has credentials for a particular network access, etc. These characteristics may be manually input by the operator and/or known or determinable by the user equipment or network, such as through device identification or authentication to the network.

As shown in FIG. 3, a network or user may further generate historical data spot information in S107 based on previous transmission resource and network user determinations in S100 and S110. The network may record specific transmission resource geographic positions over time and simply associate certain positions and times with high probabilities of transmission resource availability. Alternatively, the network may include other data and models, such as historical and planned traffic flow, user movement patterns, crowd gatherings, population, density, work hours, etc. and generate a more sophisticated historical geographic analysis in S107. For example, in FIG. 2, a network may observe regular overcrowding of base station 20b near $P_4$ and formation of high-quality ad hoc hotspots near $P_4$ during rush hours, due to traffic accumulation on a nearby highway. Coupled with traffic reports, or user statistics from base station 20b, for example, the network may associate a transmission resource's availability or content provided at $P_4$ with certain times, workdays, and/or seasons in S107. Similar types of historical data may be accumulated for each user and/or transmission resource in S107.

Based on the user's request for content, the transmission resources determined in S100, the network user characteristics determined in S110, and/or historical transmission resource data from S107, one or more data spots providing the user-requested information are determined in S115 and a travel path to the compatible data spot(s) is routed in S120. The determining in S115 may be achieved in several different ways, and several examples of determining data spot geographic position in S115 are discussed below.

In a scenario where a transmission resource is available over a large area, such as unused base station 20c offering content access over a wide geographic range, several methods of determining which specific geographic position within the range are data spots may be used in S115. For example, a specific position having a best signal quality, or within a smallest average proximity to the most sideloading users, may be determined as the data spot in S115. Or for example, a specific position that is most easily accessible to the public within a wide geographic range may be determined as data spot position in S115. As shown in FIG. 2, for example, several areas along a highway may have access to an ad hoc hotspot formed by network users travelling on the highway. Geographic position $P_4$ may be most accessible to a public user, or may have a highest network user density, or may have a largest number of transmission resource availability due to being in closest proximity to another base station 20b, a stadium filled with users at $P_6$, and Wi-Fi at $P_3$, etc, and the data spot may be thus positioned at $P_4$ in S115.

In another example, the network or network user may use existing historical data, generated in S107 or otherwise, in its determinations of data spot geographic positions in S115. For example, the network may also determine a current time, day of the week, commercial event schedule, etc. and compare it against corresponding data in the existing historical data of transmission resource availability versus time, day, commercial event, etc. to determine or corroborate data spots at geographic positions accessible to the available transmission resource in S115. Additionally, the network may account for requested content by further comparing the user-requested content against historical data. The historical data may indicate transmission resources, and geographic positions accessible thereto, that have historically offered, or offered in highest quality, at highest transmission rate, or in some other desired fashion, the requested content. Using the historical data, the network may determine a data spot that will most likely presently offer the requested data and/or meet other desired parameters.

As a further example of data spot determination, a more complex data spot determination may also be pursued in S115. The network and/or network user 100 may determine several candidate transmission resources that offer requested data, are historically available at the requested time, and are compatible with user operating characteristics. For example, user 100 may request real-time sporting event scores at $P_1$ where the network lacks the transmission resources to deliver the requested scores. The user 100 possesses a capacity to access ad hoc hotspots, Wi-Fi hotspots, and satellite data, and the user 100 indicates that the user may move by car or by foot from $P_1$. The network, having generated a map of transmission resource locations and associated characteristics and content using multiple sources of information in S100 and S107, matches the user 100 with two data spots in order of probability of acquiring the requested data in S115. Data spot at position $P_4$ is the highest-ranked location, because of its proximity to a stadium full of sideloading-capable users who have stored and are currently downloading and sharing real-time sports scores through base station 20b, and proximity to a café at $P_3$ having several users reporting free Wi-Fi that can deliver the requested sports scores available as a data spot at $P_3$. Because user 100 is vehicular, the network determines that $P_4$ is the most quickly-accessed geographic position and ranks it as the first data spot. A second-ranked data spot at $P_5$ is also determined in S115, based on the user's ability to walk, in addition to other factors used in S100, S110, and/or S107. If traffic were particularly bad, $P_5$ may have been ranked above $P_4$ as being the fastest accessed data spot for acquiring the requested scores.

A yet further example of data spot positioning in S115 may be very simplified. A network determines only ad hoc hotspot formation with minimal data transfer, such as by using control/monitoring data already transmitted to each operating user in a network to determine areas occupied by a sufficient number of sideloading users to form ad hoc hotspots. The network occasionally transmits, or pushes, the simple map or table of current ad hoc hotspots to network users, and the individual users then determine a nearest ad hoc hotspot to use as a data spot based on an input position or pre-stored map. This example method may consume minimal network transmission resources by requiring minimal data input, analysis, and transfer, and by relying on sideloading through non-network spectrum to acquire requested content.

In the above and other ways, example methods determine data spot location in S115 based on a number of flexible parameters, including costs to the network and resources required to provide a desired level of user experience, the existence and availability of a variety of different types of transmission resources, the content offered or available through the individual transmission resources, and/or historical data of when/where transmission resources create viable data spots. Aside from these example parameters, several other combinations of factors and actions may be used in ultimately selecting and determining a data spot in S115 where a user can acquire requested content, including any number of different transmission resources, economic concerns, and scenario parameters.

Further, while actions in S100, S110, S107, and S115 may be performed entirely by a single network, such as at a centralized station having processing capacity like PDSN 60 or RNC 25 of example network 10 (FIG. 1) being programmed to perform example methods, it is understood that network users or third parties may perform at least some of these actions, partially or completely, in order to further increase flexibility in example methods. Any determination results of S100, S110, S107, and/or S115 may be transmitted to the network user as final products or for use in further actions of example methods, or may be transmitted to the network to do the same. For example, BTS 20 (FIG. 1) in example network 10 may wirelessly transmit data spot geographic information to one or more users 100.

Figure 4:
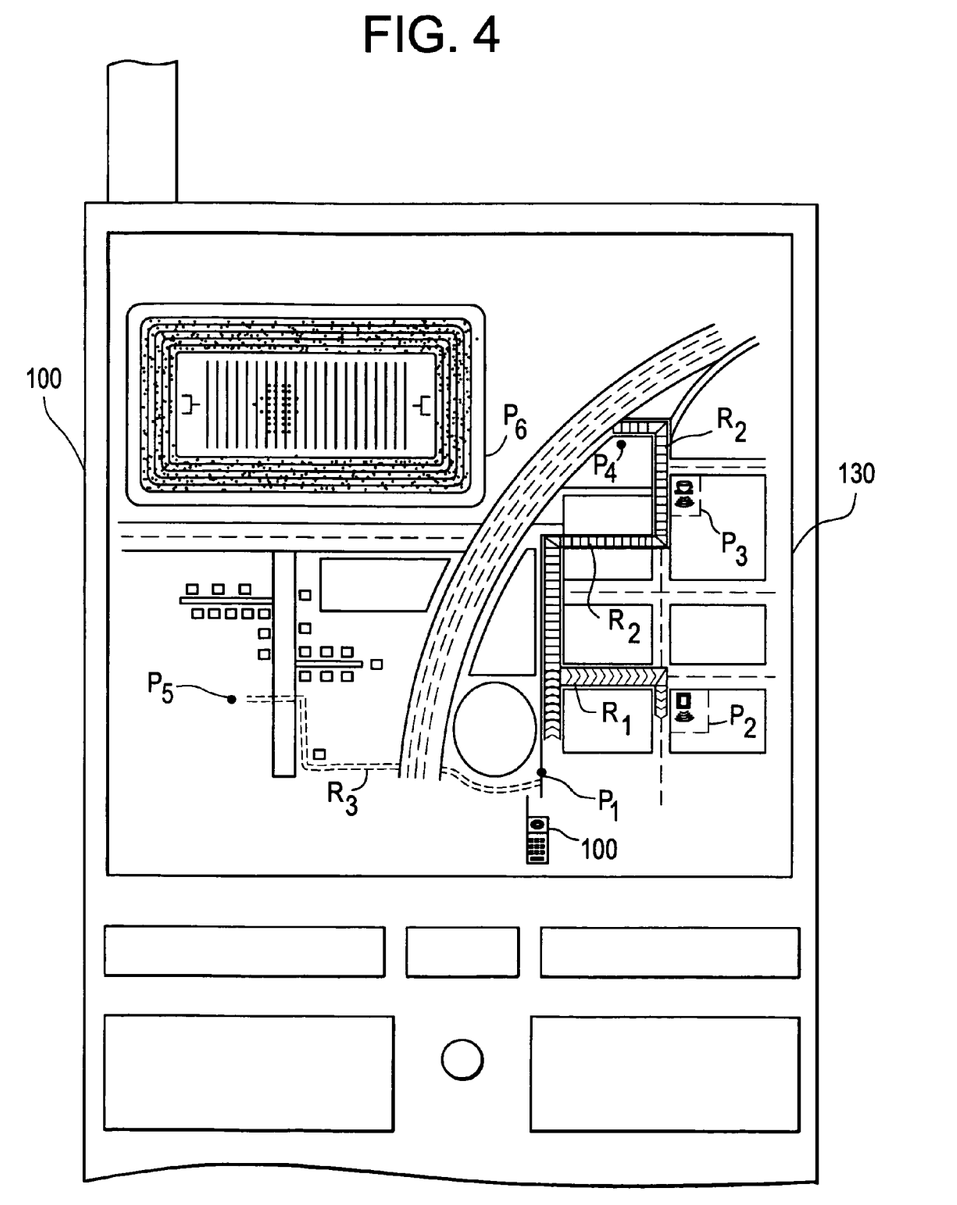
FIG. 4 is an illustration of an example guidance display in example methods of locating a geographical position of a data spot.
Figure 5:
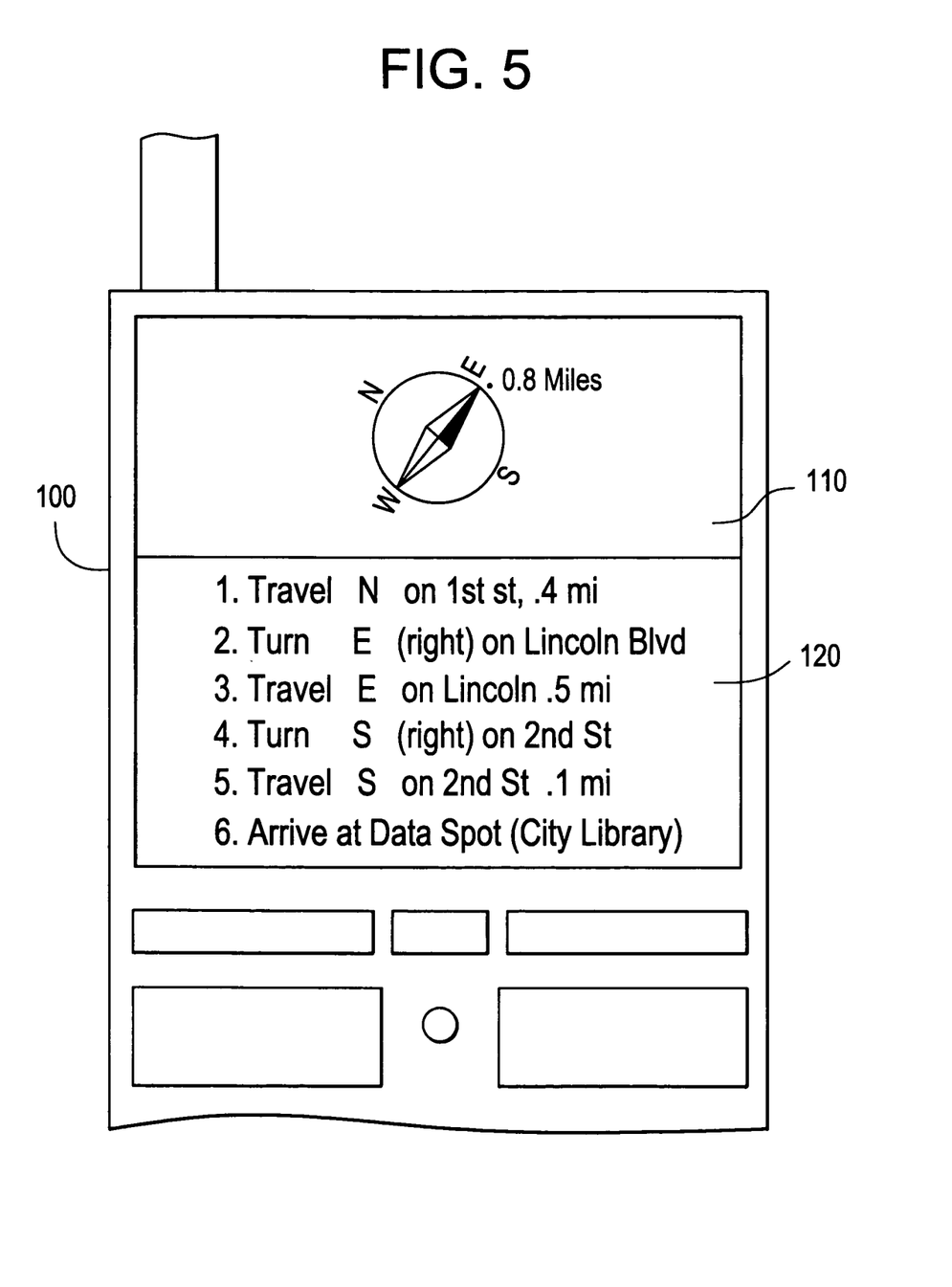
FIG. 5 is an alternate illustration of an example guidance display in example methods of locating a geographical position of a data spot.

In S120, a route or directions between the current location of the user requesting the content and the determined data spot(s) is determined. As shown in FIG. 4, for example, user 100 may determine a route $R_1$ between an operator-input current position at $P_1$ and a closest data spot $P_2$ extracted from data spot locations pushed from the network. The route $R_1$ and map may be displayed on a visual display 130 of the user 100 for an operator of the user equipment to follow. Alternately, as shown in FIG. 5, a list of directions 120, and/or compass with distance 110 may be presented to an operator of user equipment 100. The outer rose of compass 110 may display the user 100's current orientation, and an inner arrow may point in a direction of the data spot (ESE in the example shown in FIG. 5). When user input, accelerometer data, GPS data, or anything else indicates that the user moves, updated directions, route, and/or compass information may be provided as shown in S130 of FIG. 3 (discussed below).

Alternatively, where more complex data spot information is determined in S115, routes to several data spots and associated travel information may be determined in S120. For example, as shown in FIG. 4, geographic coordinates $P_4$ and $P_5$ may be determined as best data spots based on several parameters, including user content, speed demands, and payment for premium services. The user characteristics used in determining $P_4$ and $P_5$ include both walking and driving capacity, but the network has determined high traffic volumes in a wide area around $P_4$. The position of $P_4$ and a route $R_2$ to $P_4$ from $P_1$ may be shown to the operator on display 130 of user equipment 100, with additional information indicating that route $R_2$ may be delayed due to traffic. An alternate walking route R3 to P5 may additionally be shown in display 130, with information indicating that route $R_3$ requires walking but may be traversed faster than $R_2$.

Of course, several other different route determinations may be used in S120, using known routing technology and based on several other factors. It is also understood that route determinations in S120 may performed by a network, a user, and/or a third party, such as Mapquest™ or Google Maps™ using data spots and current user locations determined S100, S110, S107, and/or S115 of example methods. If not determined by the network user, the determined route may be transmitted to the network user upon calculation in S120.

The data spot determination in S115 and routing in S120 may be changed or updated in real time if transmission resources or situational characteristics change, such that a data spot location or characteristic changes, or if a user parameter, such as user position or accessibility, is updated in S130. For example, in FIG. 2, several users at an ad hoc and Wi-Fi hotspot around $P_3$ may disperse when a store closes, eliminating sideloading or Wi-Fi access potential at $P_3$. Based on this change at S130, actions in S100, S110, S107, S115, and/or S120 may be re-executed with the new scenario characteristics. Based on the re-executed method, a new data spot, such as one near $P_2$, may become the preferred or an only available data spot. Routing, compass, and/or other map/directional data may thus change to guide network user 100 to $P_2$ from a current, updated user location. Alternately, no appreciable or further changes may occur in S130, at a first instance or after several iterations through example methods, and user 100 arrives at a data spot where requested data in available.

When network user 100 arrives at a data spot, or within a communicative proximity to the data spot in S140, the user-requested content is acquired and consumed through known methods, such as sideloading discussed in incorporated co-pending application Ser. No. 12/884,994 (29250-002501/US), 802.11 connections, base station data transfer, satellite data transfer, etc. Such transfer may be network facilitated or achieved by network users or other networks.

As such, example methods may flexibly determine and guide users to data spots where requested content may be accessed/consumed/executed. Although no specific action of receiving or generating a user request for content is shown in FIG. 3, it is understood that such a request may be generated by a user, and potentially transmitted to the network, or kept at the user, at any point in example methods. That is, example methods may be executed with several actions based on the requested content or may be executed with no knowledge of the requested content, such as when an operator formulates or inputs a content request only after arriving at or being at a data spot determined by example methods without using a user content request.

It is further understood that, while example methods are described above in combination with example networks and/or user equipment configured to execute example methods, non-transitory computer-readable media, such as memory and/or processor code in user equipment and/or hard drives at a centralized network station, may store instructions that cause a processor or other user or network equipment to execute example methods. As such, example methods may also be embodied as functional software on any computer-readable medium.

Example embodiments thus being described, it will be appreciated by one skilled in the art that example methods and embodiments may be varied through routine experimentation and without further inventive activity. For example, although cellular networks are used in some example methods, it is of course understood that other types of networks including wireless content communication may use and benefit from example methods. Variations are not to be regarded as departure from the spirit and scope of the example embodiments, and all such modifications as would be obvious to one skilled in the art are intended to be included within the scope of the following claims.

What is claimed is:

1. A method of determining data spots at a network controller, the method comprising:
   determining, at the network controller, available transmission resources, the transmission resources including at least a first network user acting as an ad hoc hotspot by transmitting data via sideloading, the first network user having a geographic position associated therewith;
   determining, at the network controller, characteristics of the transmission resources, the characteristics including a geographic position of the transmission resources and content available at the transmission resources;
   determining, at the network controller, a geographic position of a data spot selected from the transmission resources, the data spot selected based on the content available at the transmission resources, a content requested by a second network user and the geographic position of the transmission resources in relation to a geographic position of the second network user, the geographic position of the first and second network users being dynamic;
   transmitting, from the network controller to the second network user, the geographic position of the data spot;
   determining a change in the geographic position of the transmission resources in relation to the geographic position of the second network user; and
   repeating the transmitting of the geographic position of the data spot to the second network user based on the determined change, wherein
   the data spot is further selected from the transmission resources based on a compatibility in communication protocols between the second network user and the transmission resources and a capability of the second network user to receive the data via the sideloading.

2. The method of claim 1, wherein the determining characteristics of the transmission resource includes determining content available from each of a plurality of transmission resources, and wherein the determining the geographic position of the data spot includes comparing the content available against content requested by the second network user.

3. The method of claim 1, further comprising:
   determining a plurality of characteristics of the second network user, the plurality of characteristics including at least one of the geographic position of the second network user, a sideloading capability of the second network user, a mode of transportation of the second network user, and communication protocol compatibility between the first network user and the second network user, wherein
   the determining the geographic position of the data spot is further based on the plurality of characteristics of the second network user.

4. The method of claim 1, wherein the determining the geographic position of the data spot includes locating positions within a communicative proximity of the transmission resources, the locating being based on at least one of distance from the geographic position of the second network user to the geographic position of the data spot, signal quality of the geographic position of the data spot, cost to the second user at the geographic position, and amount of network transmission resources consumed at the geographic position of the data spot.

5. The method of claim 4, wherein the determining the geographic position of the data spot includes determining a plurality of geographic positions each for a data spot of a plurality of data spots, 6. The method of claim 1, wherein the determining characteristics of the transmission resources is performed by the network controller and includes determining geographic positions and sideloading capabilities of a plurality of network users including the first network user and the second network user, 7. The method of claim 6, wherein the geographic positions are determined by the plurality of network users transmitting their respective geographic positions to the network controller.

8. The method of claim 1, wherein the transmission resources include at least one of a Wi-Fi hotspot and a network base station.

9. The method of claim 1, further comprising:
determining a route from the geographic position of the second network user to the geographic position of the data spot, the transmitting including transmitting the geographic position of the data spot and the determined route, 10. The method of claim 1, further comprising:
determining at least one of a direction and a distance from the geographic position of the second network user to the data spot, the transmitting including transmitting the geographic position of the data spot and the at least one of the direction and the distance, 11. The method of claim 1, further comprising:
determining a change in the characteristics of the transmission resources; and
repeating the determining the geographic position of the data spot and the transmitting further based on the determined change.

12. The method of claim 1, further comprising:
determining a characteristic of the second network user, the determining the geographic position of the data spot being further based on the determined characteristic of the second network user;
determining a change in the determined characteristic of the second network user; and
repeating the determining the geographic position of the data spot and the transmitting further based on the determined change.

13. The method of claim 1, further comprising:
determining characteristics of the second network user; and
generating historical transmission resource data based on at least one of the characteristics of transmission resources and the determined characteristic of the second network user, the determining the geographic position of the data spot being further based on the historical transmission resource data.

14. The method of claim 13, wherein the historical transmission resource data includes a position of the transmission resource in association with at least one of time and event.

15. A method of providing content to a first network user from a network controller, the method comprising:
receiving, at the network controller, a request for content from the first network user, the content not being currently available at a geographic position of the first network user;
determining, at the network controller, available transmission resources, the transmission resources including at least a second network user acting as an ad hoc hotspot by transmitting data via sideloading, the second network user having a geographic position associated therewith;
determining, at the network controller, characteristics of the transmission resources, the characteristics including content available at the transmission resources;
positioning at least one of the transmission resources as a data spot, the data spot selected based on the content available at the transmission resources, the content requested by the first network user and the geographic position of the transmission resources in relation to the geographic position of the first network user, the geographic position of the first and second network users being dynamic;
transmitting, from the network controller to the first network user, the position of the data spot;
determining a change in the geographic position of the transmission resources in relation to the geographic position of the first network user; and
repeating the transmitting of the geographic position of the data spot to the first network user based on the determined change, wherein
the data spot is further selected from the transmission resources based on a compatibility in communication protocols between the first network user and the transmission resources and a capability of the first network user to receive the data via the sideloading.

16. The method of claim 15, further comprising:
determining a plurality of characteristics of the first network user, the plurality of characteristics including at least one of the geographic position of the first network user, a sideloading capability of the first network user, a mode of transportation of the first network user, and communication protocol compatibility between the first network user and the second network user, wherein
the positioning the data spot is further based on the plurality of characteristics of the first network user.

17. A central station for a network configured to provide data spot information to network users wirelessly connected to the network, the central station comprising:
a network controller configured to,
determine, at the network controller, available transmission resources, the transmission resources including at least a first network users acting as an ad hoc hotspot by transmitting data via sideloading, the first network users having a geographic position associated therewith;
determine, at the network controller, characteristics of a the transmission resources, the characteristics including a geographic position of the transmission resource and content available at the transmission resource;
determine, at the network controller, a geographic position of a data spot selected from the transmission resources, the data spot selected based on the content available at the transmission resources, a content requested by a second network users and the geographic position of the transmission resources in relation to a geographic position of the second network user, the geographic position of the first and second network users being dynamic;

transmit, from the network controller to the second network user, the geographic position of the data spot;
determine a change in the geographic position of the transmission resources in relation to the geographic position of the second network user and
repeat the transmitting of the geographic position of the data spot to the second network users based on the determined change, wherein the data spot is further selected from the transmission resources based on a compatibility in communication protocols between the second network user and the transmission resources and a capability of the second network users to receive the data via the sideloading.

18. The central station of claim 17, wherein the determining the geographic position of the data spot includes comparing the content available against content requested by the second network user.

19. The central station of claim 17, wherein the central station is configured to determine a plurality of characteristics of the second network user, the plurality of characteristics including at least one of the geographic position of the second network user, a sideloading capability of the second network user, a mode of transportation of the second network user, and communication protocol compatibility between the first network user and the second network user, wherein
the determining the geographic position of the data spot is further based on the plurality of characteristics of the second network user.

20. The central station of claim 17, wherein the determining the geographic position of the data spot includes locating positions within a communicative proximity of the transmission resources, the locating being based on at least one of distance from the geographic position of the second network user to the geographic position of the data spot, signal quality of the geographic position of the data spot, cost to the second network user at the geographic position, and amount of network transmission resources consumed at the geographic position of the data spot.

21. The central station of claim 17, wherein the transmission resources include at least one of a Wi-Fi hotspot and a network base station.

22. The central station of claim 17, wherein the central station is further configured to,
determine a change in the characteristics of the transmission resources; and
repeat the determining the geographic position of the data spot and the transmitting further based on the determined change.

23. The central station of claim 17, wherein the central station is further configured to,
determine a characteristic of the second network user, the determining the geographic position of the data spot being further based on the determined characteristics of the second network user;
determine a change in the determined characteristic of the second network user; and
repeat the determining the geographic position of the data spot and the transmitting further based on the determined change.

24. The central station of claim 17, wherein the central station is further configured to generate historical transmission resource data based on at least one of the characteristics of transmission resources and the determined characteristic of the second network user, the determining the geographic position of the data spot being further based on the historical transmission resource data.

25. A non-transitory computer-readable medium storing code that when executed performs a method comprising:
determining, at a network controller, available transmission resources, the transmission resources including at least a first network user acting as an ad hoc hotspot by transmitting data via sideloading, the first network user having a geographic position associated therewith;
determining, at the network controller, characteristics of a the transmission resources, the characteristics including a geographic position of the transmission resource and content available at the transmission resource;
determining, at the network controller, a geographic position of a data spot selected from the transmission resources, the data spot selected based on the content available at the transmission resources, a content requested by a second network user, the geographic position of the transmission resources in relation to a geographic position of the second network user, the geographic position of the first and second network users being dynamic;
transmitting, from a network controller to the second network user, the geographic position of the data spot determining a change in the geographic position of the transmission resources in relation to the geographic position of the second network user; and
repeating the transmitting of the geographic position of the data spot to the second network user based on the determined change, wherein
the data spot is further selected from the transmission resources based on a compatibility in communication protocols between the second network user and the transmission resources and a capability of the second network user to receive the data via the sideloading.

26. The medium of claim 25, wherein the determining the geographic position of the data spot includes comparing the content available against content requested by the second network user.

27. The medium of claim 25, wherein the method further comprises:
determining a plurality of characteristics of the second network user, the plurality of characteristics including at least one of the geographic position of the second network user, a sideloading capability of the second network user, a mode of transportation of the second network user, and communication protocol compatibility between the first network user and the second network user, wherein
the determining the geographic position of the data spot is further based on the plurality of characteristics of the second network user.

28. The medium of claim 25, wherein the determining the geographic position of the data spot includes locating positions within a communicative proximity of the transmission resources, the locating being based on at least one of distance from the geographic position of the second network user to the geographic position of the data spot, signal quality of the geographic position of the data spot, cost to the second user at the geographic position, and amount of network transmission resources consumed at the geographic position of the data spot.

29. The medium of claim 28, wherein the determining the geographic position of the data spot includes determining a plurality of geographic positions each for a data spot of a plurality of data spots.

30. The medium of claim 25, wherein the determining characteristics of the transmission resources is performed by the network controller and includes determining geographic positions and sideloading capabilities of a plurality of network users including the first network user and the second network user.

31. The medium of claim 30, wherein the geographic positions are determined by the plurality of network users transmitting their respective geographic positions to the network controller.

32. The medium of claim 25, wherein the transmission resources include at least one of a Wi-Fi hotspot and a network base station.

33. The medium of claim 25, further comprising:
determining a route from the geographic position of the second network user to the geographic position of the data spot, the transmitting including transmitting the geographic position of the data spot and the determined route.

34. The medium of claim 25, wherein the method further comprises:
determining a change in the characteristics of the transmission resources; and
repeating the determining the geographic position of the data spot and the transmitting further based on the determined change.

35. The medium of claim 25, wherein the method further comprises:
determining a characteristic of the second network user, the determining the geographic position of the data spot being further based on the determined characteristic of the second network user;
determining a change in the determined characteristic of the second network user; and
repeating the determining the geographic position of the data spot and the transmitting further based on the determined change.

36. A non-transitory computer-readable medium storing code that when executed performs a method comprising:
receiving, at a first network user from a network controller, a geographic position of a data spot, the data spot being selected from transmission resources by the network controller, the transmission resources including at least a second network user acting as an ad hoc hotspot by transmitting data via sideloading, the second network user having a geographic position associated therewith, the selection based on content available at the transmission resources, content requested by the first network user and a geographic position of the transmission resources in relation to a geographic position of the first network user, the geographic position of the first and second network users being dynamic;
determining a change in the geographic position of the transmission resources in relation to the geographic position of the first network user; and
repeating the transmitting of the geographic position of the data spot to the first network user based on the determined change, wherein
the data spot is further selected from the transmission resources based on a compatibility in communication protocols between the first network user and the transmission resources and a capability of the first network user to receive the data via the sideloading.

37. The medium of claim 36, wherein the method when executed further includes,
determining a route from the geographic position of the first network user to the geographic position of the data spot.

* * * * *